May 2, 1939.　　　　W. A. SPECHT　　　　2,156,882
CIRCUIT CLOSER
Original Filed May 16, 1935
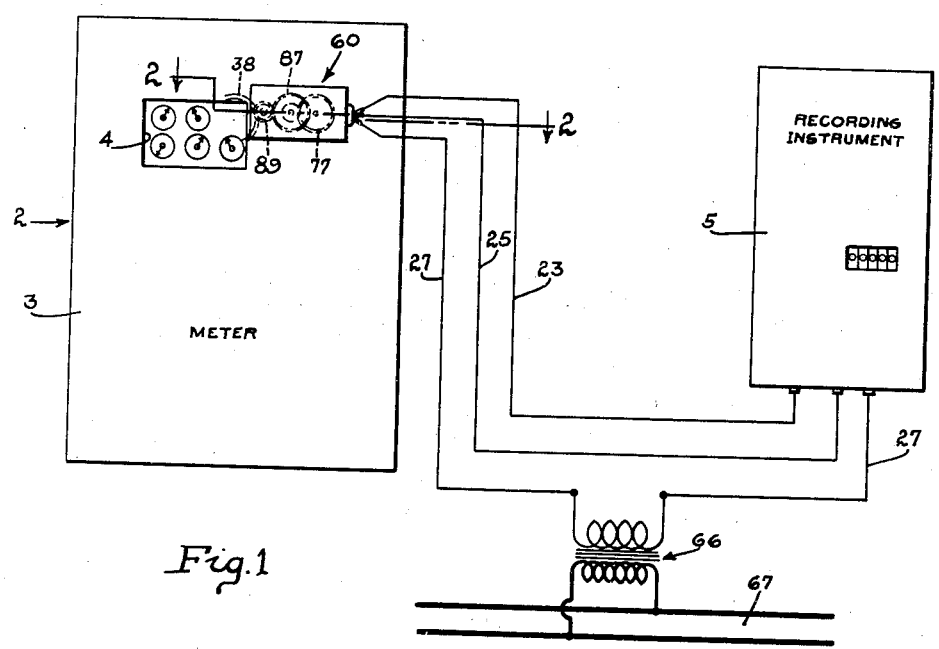
Fig.1
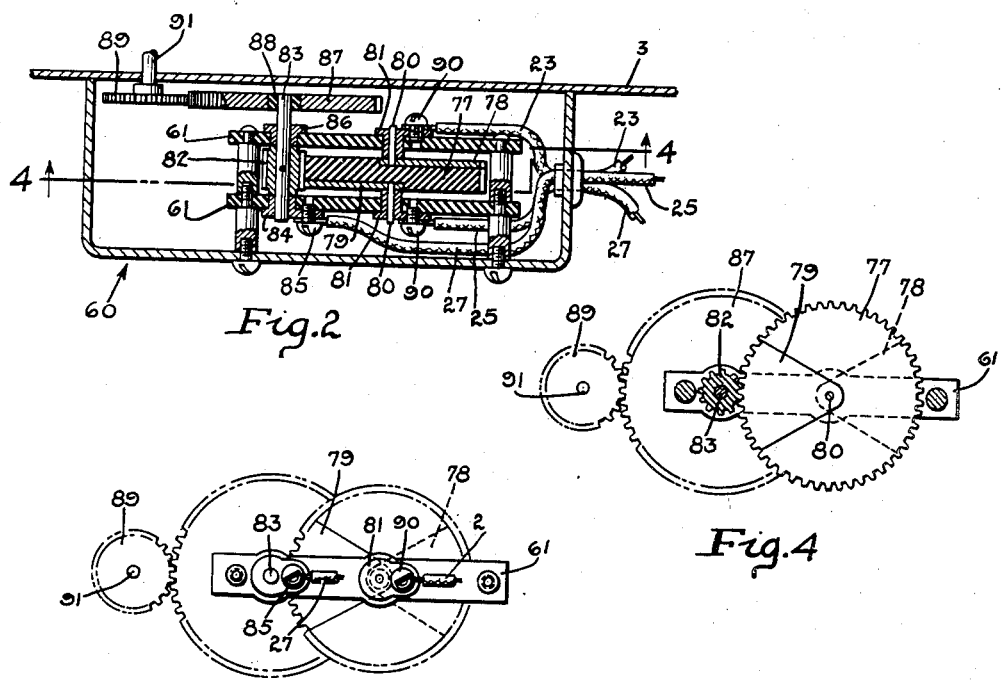
Fig.2
Fig.3
Fig.4
INVENTOR
WALTER A. SPECHT
BY
ATTORNEYS Patented May 2, 1939

2,156,882

UNITED STATES PATENT OFFICE 2,156,882

CIRCUIT CLOSER

Walter A. Specht, Minneapolis, Minn.

Original application May 16, 1935, Serial No. 21,828. Divided and this application December 16, 1935, Serial No. 54,723

2 Claims. (Cl. 200—6)

This application is a division of my pending application, Serial No. 21,828, filed May 16, 1935.

The present invention relates to an improved device adapted for use in connection with a meter to operate a recording instrument located remotely from the meter and whereby the reading on the meter may be noted at a remote point therefrom.

An object of the invention is to provide a simple and inexpensive circuit breaker adapted for use to control the flow of current to a device to be intermittently supplied with current, which circuit breaker operates in timed relation to a suitable driving means such as the operating mechanism of a meter, whereby the supply of current to the recording instrument is accurately controlled.

A further object is to provide a circuit breaker comprising a toothed member of non-conductive material having segmental conductor plates secured thereto and adapted to alternately open and close a plurality of circuits, thereby to cause intermittent current flow through the circuits.

A further object is to provide a circuit breaker which is extremely simple and inexpensive in construction, whereby it may be manufactured at small cost, and which is positive in operation, and is well-suited for use in connection with a meter to intermittently control the supply of current to a recording instrument located remotely therefrom, whereby the reading of the meter is accurately recorded on the remotely located instrument.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a diagrammatic view showing the invention applied to an ordinary meter;

Figure 2 is an enlarged detail sectional view on the line 2—2 of Figure 1, showing the general construction of the circuit breaker;

Figure 3 is a front view of the circuit breaker only, with the housing removed therefrom, and showing one of the conductor plates in electrical engagement with the pinion connected to the power source; and Figure 4 is a sectional view on the line 4—4 of Figure 2, with the parts positioned substantially as shown in Figure 3.

In the selected embodiment of the invention here shown, there is illustrated in Figure 1, for purposes of disclosure, a conventional gas meter, generally indicated by the numeral 2, comprising a casing 3 having a window or opening 4 in a wall thereof, through which the reading on the meter may be read. Meters, such as are commonly used for measuring gas, electric current, and water, are usually located in basements or in out-of-the-way places, and therefore require that the meter reader enter the building in order to record the reading thereof. It is often objectionable to meter readers to thus enter the building, and it is therefore desirable that a recording instrument be provided in connection with the usual meter which may be located in a convenient place remote from the meter as, for example, in a window, whereby the reader may take the readings of the meter from the exterior of the building.

Such a recording instrument is diagrammatically illustrated at 5 in Figure 1, and is described in detail in my pending application, Serial No. 21,828, and is therefore thought unnecessary to herein illustrate and describe the same in detail.

An important feature of the present invention resides in the means provided for operatively connecting the recording instrument 5 to the operating mechanism of the meter, to cause it to operate in timed relation thereto, and whereby the reading on the meter will be accurately recorded on the instrument 5.

The means provided for thus operatively connecting the recording instrument to the meter comprises a circuit closer, generally indicated by the numeral 60, and shown comprising a toothed wheel 77 of a suitable non-conductive material. To the opposite sides of this wheel are secured oppositely disposed current conducting plates 78 and 79, as best shown in Figure 2. These current conducting plates are insulated from one another and are shown provided with trunnions 80 supported in suitable bearings 81 provided in the frame members 61 of the frame of the circuit closer, as clearly illustrated in Figure 2. The bearings 81 are electrically connected to suitable terminals 90 secured to the frame members 61, whereby the conductor plates 78 and 79 are also electrically connected to the terminals 90.

The rotatable member or wheel 77 and conductor plates 78 and 79 have their peripheries provided with suitable gear teeth, as best shown in Figures 3 and 4, which are arranged to mesh with a pinion 82 secured to a shaft 83, one end of which is supported in a bearing 84 mounted in one of the frame members 61 of the circuit closer and having a terminal post 85 secured thereto. A similar bearing 86 is mounted in the other frame member 61 of the circuit closer to support the opposite end of the shaft 83. A gear 87 is secured to the projecting end of the shaft 83 and is shown insulated therefrom by suitable insulating material 88. A suitable pinion 89 constantly engages the gear wheel 87 and has a shaft 91 connecting it to the usual operating mechanism of the meter 2, indicated at 38 in Figure 1.

When the novel circuit closer herein disclosed, is used in connection with an electrically operated recording instrument, as illustrated in Figure 1, it is electrically connected thereto by suitable wires 23, 25, and 27, connected respectively to the terminal posts 90 and 85. The secondary side of a suitable transformer 66 is connected in the wire 27 and the primary side of the transformer is connected to a supply circuit 67, as illustrated in Figure 1.

When the circuit closer is used in connection with a meter as herein illustrated, its shaft 91 will be constantly rotated by the operating mechanism 38 of the meter, when the latter is operating. Such rotation of the shaft 91 will cause rotation of the member or wheel 77 because of its driving connection with the pinion 82, whereupon the conducting plate 78 and 79 will be rotated to alternately move into and out of electrical engagement with the pinion 82, whereby current is alternately caused to flow through the wires 23 and 25 leading to the recording instrument 5. This results because of the pinion 82 being electrically connected to the power wire 27.

The circuit closer 60 is very simple and inexpensive in construction and it is to be noted that it comprises no brush contacts or other sliding contacts. The circuits through the wires 23 and 25 are alternately closed by the pinion 82 alternately engaging the toothed peripheries of the conductor plates 78 and 79 as the shaft rotates, thus providing a very simple and efficient circuit breaker, and one which is substantially positive in operation.

In the foregoing, I have described the circuit closer 60 as being used in connection with a meter for controlling the flow of current to a recording instrument located remotely therefrom. It is to be understood, however, that the circuit closer may be used for other purposes where applicable, without departing from the scope of the invention.

I claim as my invention:

1. A circuit closer comprising a pair of spaced parallel frame members of insulating material, a gear of non-conductive material mounted between said frame members, bearings of conductive material secured in said frame members and having means whereby a pair of electric wires may be connected thereto, segmental conductor plates secured to the gear and having pivots mounted in said bearings and electrically connecting the segments to said bearings, and a pinion adapted to be connected to a source of electric energy, said pinion meshing with said gear and alternately engaging the conductor plates whereby said conductor plates are alternately energized to control current flow through said wires.

2. A circuit closer comprising a pair of spaced parallel frame members of insulating material, a gear of non-conductive material mounted between said frame members, bearings of conductive material secured in said frame members and each having a terminal post to which electric wires may be connected a plurality of segmental conductor plates secured to the gear and having trunnions fixed thereto and received in said bearings, a shaft rotatably supported in said frame members and having a pinion secured thereto, said pinion meshing with said gear and alternately engaging the conductor plates, and means whereby said pinion may be connected to a source of electric energy whereby said conductor plates may be alternately energized to control current flow through said wires.

WALTER A. SPECHT.